United States Patent
Sunaga et al.

(10) Patent No.: US 7,551,943 B2
(45) Date of Patent: Jun. 23, 2009

(54) WIRELESS COMMUNICATION METHOD, WIRELESS COMMUNICATION SYSTEM, AND WIRELESS COMMUNICATION DEVICE

(75) Inventors: Tohru Sunaga, Kawasaki (JP); Shigeru Kimura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 560 days.

(21) Appl. No.: 11/386,447

(22) Filed: Mar. 21, 2006

(65) Prior Publication Data

US 2006/0217075 A1 Sep. 28, 2006

(30) Foreign Application Priority Data

Mar. 25, 2005 (JP) .......................... P2005-088198

(51) Int. Cl.
*H04B 7/00* (2006.01)
(52) U.S. Cl. .................. 455/562.1; 455/101; 375/267
(58) Field of Classification Search ................. 455/561, 455/562.1, 101, 277.1, 277.2; 375/260, 267, 375/347
See application file for complete search history.

(56) References Cited

U.S. PATENT DOCUMENTS 7,242,720 B2 * 7/2007 Sugiyama et al. ........... 375/260
7,257,424 B2 * 8/2007 Hamalainen et al. ...... 455/562.1

OTHER PUBLICATIONS

Nobuyoshi Kikuma, "Adaptive Signal Processing With Array Antenna" published Nov. 1998 by Kagaku Gijyutsu Publishing Co., Ltd.
New Generation Wireless Technique, Mar. 24, 2004.

* cited by examiner

*Primary Examiner*—Thanh C Le
(74) *Attorney, Agent, or Firm*—Hogan & Hartson LLP

(57) ABSTRACT

A wireless communication method includes: transmitting an estimation signal from a first communication device with a first plurality of antenna elements to a second communication device with a second plurality of antenna elements at a training phase for synchronization in a first type of wireless communication using an adaptive array system between the first and second communication devices; detecting the estimation signal by the second communication device; and estimating, based on the detection of the estimation signal, whether or not a wireless communication channel between the first and second communication devices is adaptable to a second type of wireless communication using a multi-input multi-output (MIMO) system.

13 Claims, 7 Drawing Sheets $M_0 = \min(M, N)$

WIRELESS COMMUNICATION METHOD, WIRELESS COMMUNICATION SYSTEM, AND WIRELESS COMMUNICATION DEVICE

BACKGROUND OF THE INVENTION

1. Field of the Invention

The present invention generally relates to a wireless communication method, a wireless communication system and a wireless communication device.

Priority is claimed on Japanese Patent Application No. 2005-088198, filed Mar. 25, 2005, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A conventional mobile communication system includes a base station and one or more mobile stations such as mobile terminals. The base station has an array antenna that includes a plurality of antenna elements that have a directional pattern for transmitting and receiving radio waves. The array antenna follows movement of the mobile station. In view of maintaining a desired quality of wireless communication between the base station and the mobile station, it is preferable for the mobile terminal such as a mobile telephone to have an array antenna with a directional pattern for transmitting and receiving radio waves so as to improve an ability to continue wireless communication access to the base station.

Typical examples of the known methods of controlling the directivity of the array antenna may include, but are not limited to, adaptive algorithms such as an RLS algorithm, an SMI algorithm, an LMS algorithm, all of which refer to Minimum Mean-Squared Error (MMSE). The mobile station uses the adaptive algorithm to calculate a weight factor of each of the antenna elements that form the directional pattern of the array antenna, wherein the calculation is made so as to minimize a squared error of a received signal from the base station with reference to a reference signal, thereby directing a null point toward an arrival point of an interference wave and also directing a main beam toward another arrival point of a desired wave. This technique is disclosed by KIKUMA Nobuyoshi in "Adaptive Signal Processing with Array Antenna" published November 1998 by Kagaku Gijyutsu Publishing Co., Ltd.

The adaptive array system is one of the typical wireless communication techniques using array antennas. Another example of the wireless communication techniques using array antennas is a multi-input multi-output (MIMO). In the multi-input multi-output (MIMO) system, each of the base station and the mobile station has an array antenna that includes a plurality of antenna elements. A plurality of propagation paths for a spatial division multiple access are established between a first plurality of antenna elements of the base station and a second plurality of antenna elements of the mobile station. The spatial division multiple access improves the communication speed. When each of the mobile station and the base station has an array antenna including four antenna elements, four propagation paths for the spatial division multiple access are established between a single pair of the mobile station and the base station. The spatial division multiple access through the four propagation paths provides an increased communication speed which is four-fold higher than the communication speed provided by using a single propagation path between the base station and the mobile station.

The adaptive array system and the multi-input multi-output (MIMO) system are different from each other in the adaptivity of a wireless propagation path. A suitable one of the adaptive array system and the multi-input multi-output (MIMO) system is selected in accordance with the current state of the wireless propagation path. When each of the base station and the mobile station has the array antenna including the plurality of the antenna elements, a plurality of propagation paths are established between a plurality of combinations of the antenna elements of the base station and the mobile station. When a spatial orthogonality of the wireless communication channels is higher than a predetermined threshold level, the propagation paths are highly suitable and adaptable to the multi-input multi-output (MIMO) system. When a spatial orthogonality of the wireless communication channels is lower than a predetermined threshold level, the propagation paths are highly suitable and adaptable to the adaptive array system.

In the communication system, the change in the state of propagation of radio waves between a transmitter station and a receiver station is continuous. The continuous change causes a continuous change in the spatial orthogonality between the propagation paths that are established between the plural combinations of the antenna elements of the base station and the mobile station. It is desired to continue monitoring the spatial orthogonality and select a more suitable one of the adaptive array system and the multi-input multi-output (MIMO) system. The adaptive array system and the multi-input multi-output (MIMO) system are different from each other in a process of adding a signal to the antenna element. It is difficult for the conventional techniques to switch between the adaptive array system and the multi-input multi-output (MIMO) system without discontinuing the current communication. When the adaptive array system is switched to the multi-input multi-output (MIMO) system, it is preferable to estimate the spatial orthogonality between the wireless propagation paths that are established between the plural combinations of the antenna elements of the base station and the mobile station. It is difficult for the conventional technique to estimate the spatial orthogonality without discontinuing the current communication between the base station and the mobile station.

In view of the above, it will be apparent to those skilled in the art from this disclosure that there exists a need for an improved system, method and/or apparatus. This invention addresses this need in the art as well as other needs, which will become apparent to those skilled in the art from this disclosure.

SUMMARY OF THE INVENTION

Accordingly, it is a primary object of the present invention to provide a wireless communication method.

It is another object of the present invention to provide a wireless communication system.

It is a further object of the present invention to provide a wireless communication device.

In accordance with a first aspect of the present invention, a wireless communication method includes: transmitting an estimation signal from a first communication device with a first plurality of antenna elements to a second communication device with a second plurality of antenna elements at a training phase for synchronization in a first type of wireless communication using an adaptive array system between the first and second communication devices; detecting the estimation signal by the second communication device; estimating, based on the detection of the estimation signal, whether or not a wireless communication channel between the first and second communication devices is adaptable to a second type of wireless communication using a multi-input multi-output (MIMO) system.

Preferably, estimating may include judging whether or not a spatial orthogonality of the wireless communication channels is higher than a predetermined threshold level.

Preferably, the estimation signal may be separated from a segment that is subjected to a weighted synthesis in the adaptive array system.

In accordance with a second aspect of the present invention, a wireless communication system includes: a first communication device having a first plurality of antenna elements; and a second communication device having a second plurality of antenna elements. The first and second communication devices are adapted to perform a first type of wireless communication with each other using an adaptive array system and a second type of wireless communication with each other using a multi-input multi-output (MIMO) system. The first communication device may further include: a first transmitter that transmits an estimation signal to the second communication device at a training phase for synchronization in the first type of wireless communication. The second communication device may further include: a detector that detects the estimation signal; and an estimating unit that estimates, based on the detection of the estimation signal, whether or not a wireless communication channel between the first and second communication devices is adaptable to the second type of wireless communication.

Preferably, the second communication device may further include: a second transmitter that transmits a result of estimation made by the estimating unit to the first communication device. The first communication device may further include: a judging unit that judges, based on the result of estimation, whether the first type of wireless communication should be continued or switched to the second type of wireless communication; a third transmitter that transmits, to the second communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

Preferably, the second communication device may further include: a judging unit that judges, based on a result of estimation made by the estimating unit, whether the first type of wireless communication should be continued or switched to the second type of wireless communication; and a switch-requesting unit that transmits, to the first communication device, a request for switching the first type of wireless communication to the second type of wireless communication. The first communication device may further include: a switching unit that switches, in accordance with the request by the switch-requesting unit, the first type of wireless communication to the second type of wireless communication.

In accordance with a third aspect of the present invention, a wireless communication system includes: a first communication device having a first plurality of antenna elements; and a second communication device having a second plurality of antenna elements. The first and second communication devices are adapted to perform a first type of wireless communication with each other using an adaptive array system and a second type of wireless communication with each other using a multi-input multi-output (MIMO) system. The first communication device further includes: a first transmitter that transmits an estimation signal to the second communication device at a training phase for synchronization in the first type of wireless communication. The second communication device further includes: a detector that detects the estimation signal; an operating unit that performs a predetermined operation to estimate, based on the detection of the estimation signal, whether or not a wireless communication channel between the first and second communication devices is adaptable to the second type of wireless communication; and a second transmitter that transmits a result of the operation made by the operating unit to the first communication device. The first communication device further includes: a first judging unit that judges, based on the result of operation, whether or not a wireless communication channel between the first and second communication devices is adaptable to the second type of wireless communication; a second judging unit that judges, based on the result of judgment by the first judging unit, whether the first type of wireless communication should be continued or switched to the second type of wireless communication; a third transmitter that transmits, to the second communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

In accordance with a fourth aspect of the present invention, a wireless communication device is adapted to perform a first type of wireless communication with a different wireless communication device by using an adaptive array system and a second type of wireless communication with the different wireless communication device by using a multi-input multi-output (MIMO) system. The wireless communication device includes: a plurality of antenna elements; a first transmitter that transmits an estimation signal to the second communication device at a training phase for synchronization in the first type of wireless communication; a judging unit that judges whether the first type of wireless communication should be continued or switched to the second type of wireless communication, based on a result of estimation of whether or not a wireless communication channel to the different wireless communication device is adaptable to the second type of wireless communication; a second transmitter that transmits, to the different wireless communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

In accordance with a fifth aspect of the present invention, a wireless communication device is adapted to perform a first type of wireless communication with a different wireless communication device by using an adaptive array system and a second type of wireless communication with the different wireless communication device by using a multi-input multi-output (MIMO) system. The wireless communication device includes: a plurality of antenna elements; a first transmitter that transmits an estimation signal to the second communication device at a training phase for synchronization in the first type of wireless communication; and a switching unit that switches the first type of wireless communication to the second type of wireless communication in accordance with a request for switching the first type of wireless communication to the second type of wireless communication.

In accordance with a sixth aspect of the present invention, a wireless communication device is adapted to perform a first type of wireless communication with a different wireless communication device by using an adaptive array system and a second type of wireless communication with the different wireless communication device by using a multi-input multi-output (MIMO) system. The wireless communication device includes: a plurality of antenna elements; a detector that detects an estimation signal that is transmitted from the different wireless communication device; and an estimating unit that estimates, based on the detection of the estimation signal, whether or not a wireless communication channel to the different wireless communication device is adaptable to the second type of wireless communication.

Preferably, the wireless communication device may further include: a second transmitter that transmits a result of estimation made by the estimating unit to the different wireless communication device.

Preferably, the wireless communication may further include: a judging unit that judges, based on a result of estimation made by the estimating unit, whether the first type of wireless communication should be continued or switched to the second type of wireless communication; and a switch-requesting unit that transmits, to the different wireless communication device, a request for switching the first type of wireless communication to the second type of wireless communication.

In accordance with a seventh aspect of the present invention, a wireless communication device is adapted to perform a first type of wireless communication with a different wireless communication device by using an adaptive array system and a second type of wireless communication with the different wireless communication device by using a multi-input multi-output (MIMO) system. The wireless communication device includes: a plurality of antenna elements; a detector that detects an estimation signal that is transmitted from the different wireless communication device; an operating unit that performs a predetermined operation to estimate, based on the detection of the estimation signal, whether or not a wireless communication channel to the different wireless communication device is adaptable to the second type of wireless communication; and a transmitter that transmits a result of the operation made by the operating unit to the different wireless communication device.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
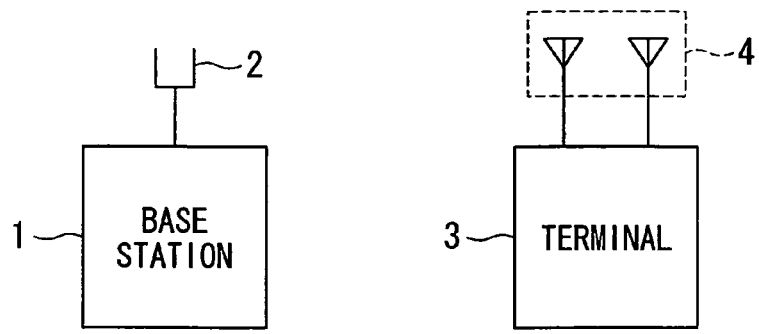
FIG. 1 is a schematic view illustrating a configuration of a wireless communication system in accordance with preferred embodiments of the present invention.

FIG. 1 is a schematic view illustrating a configuration of a wireless communication system in accordance with the first embodiment of the present invention. The wireless communication system includes a base station 1 and a terminal 3. The base station 1 has a first array antenna 2 that includes a plurality of first antenna elements. The terminal 3 also has a second array antenna 4 that includes a plurality of second antenna elements. Each of the base station 1 and the terminal 3 has a first function of communication using the adaptive array system and a second function of communication using the multi-input multi-output (MIMO) system.

The wireless communication system of FIG. 1 may perform an operation of switching a first type of wireless communication using the adaptive array system to a second type of wireless communication using the multi-input multi-output (MIMO) system without discontinuing the communications.

Figure 2:
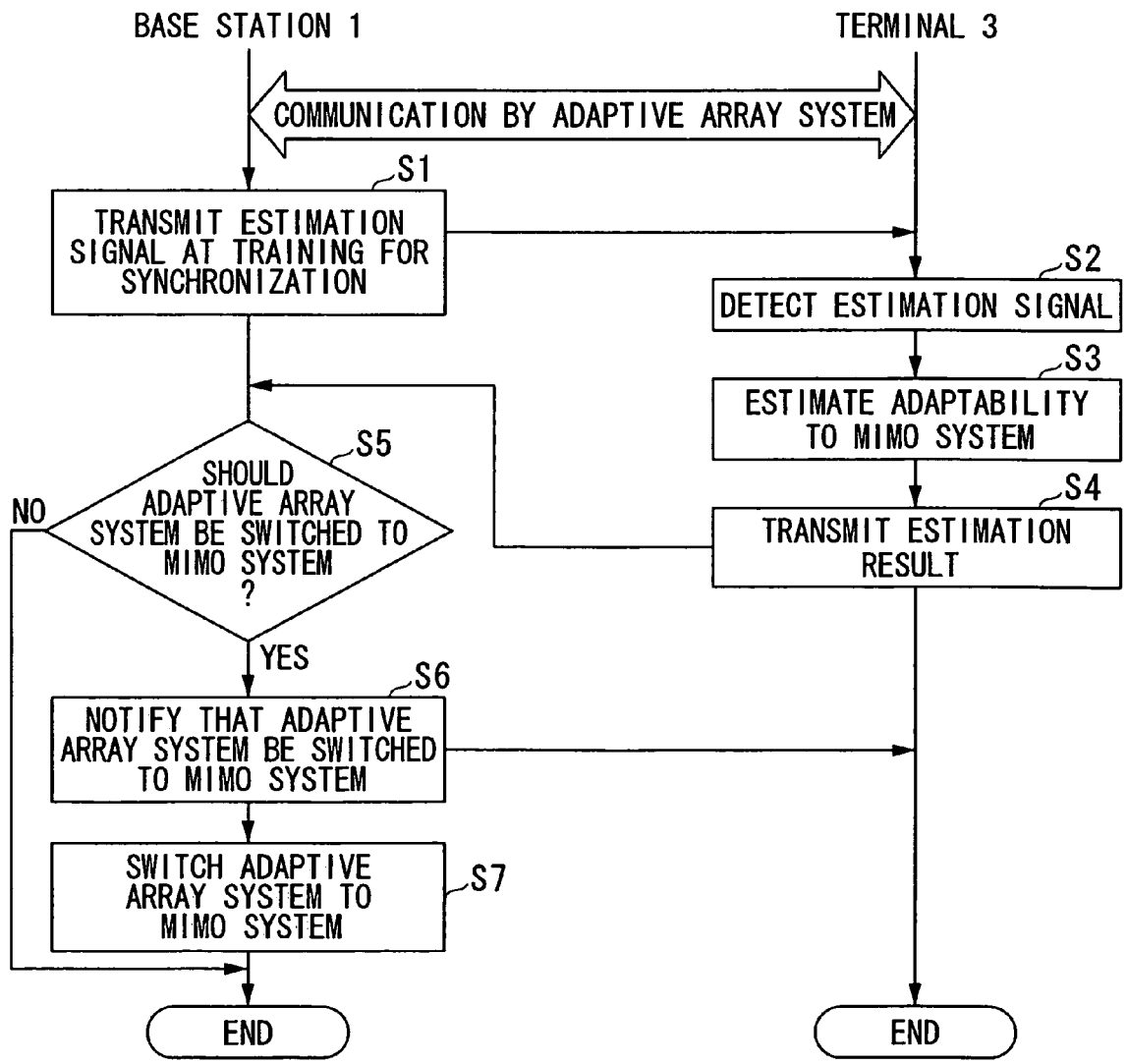
FIG. 2 is a flowchart illustrating sequential processes for switching a first type of wireless communication using an adaptive array system to a second type of wireless communication using a multi-input multi-output (MIMO) system in accordance with a first preferred embodiment of the present invention.

FIG. 2 is a flowchart illustrating sequential processes for switching the first type of wireless communication using the adaptive array system to the second type of wireless communication using the multi-input multi-output (MIMO) system in accordance with the first preferred embodiment of the present invention. The first type of wireless communication using the adaptive array system is performed between the base station 1 and the terminal 3. The first type of wireless communication may be bidirectional or unidirectional. In the first type of wireless communication using the adaptive array system, the base station 1 performs training for synchronization with the terminal 3. In Step SI, at the time of training for synchronization, the base station 1 transmits, to the terminal 3, an estimation signal that requests an estimate of the adaptability of a wireless propagation channel to the multi-input multi-output (MIMO) system. In Step S2, the terminal 3 detects the estimation signal that has been transmitted from the base station 1. In Step S3, in accordance with the estimation signal, the terminal 3 estimates the adaptability of the wireless propagation channel to the multi-input multi-output (MIMO) system. In Step S4, the terminal 3 transmits a result of the estimation on the adaptability to the base station 1.

The base station 1 receives the result of the estimation on the adaptability from the terminal 3. In Step S5, the base station 1 judges, based on the result of the estimation, whether the first type of wireless communication using the adaptive array system should be continued or switched to the second type of wireless communication using the multi-input multi-output (MIMO) system. In Step S6, if the first type of wireless communication using the adaptive array system should be switched to the second type of wireless communication using the multi-input multi-output (MIMO) system, then the base station 1 sends the terminal 3 a notice to switch the first type of wireless communication using the adaptive array system to the second type of wireless communication using the multi-input multi-output (MIMO) system. In Step S7, the base station 1 switches the first type of wireless communication using the adaptive array system to the second type of wireless communication using the multi-input multi-output (MIMO) system whereby the second type of wireless communication using the multi-input multi-output (MIMO) system is performed between the base station 1 and the terminal 3.

The base station 1 judges if the first type of wireless communication using the adaptive array system should be continued or switched to the second type of wireless communication using the multi-input multi-output (MIMO) system. The base station 1 makes the judgment in accordance with an available resource thereof, so as to avoid any excess load to be applied to the base station 1, thereby allowing the base station 1 to communicate with one or more different terminals than the terminal 3.

Second Embodiment

Figure 3:
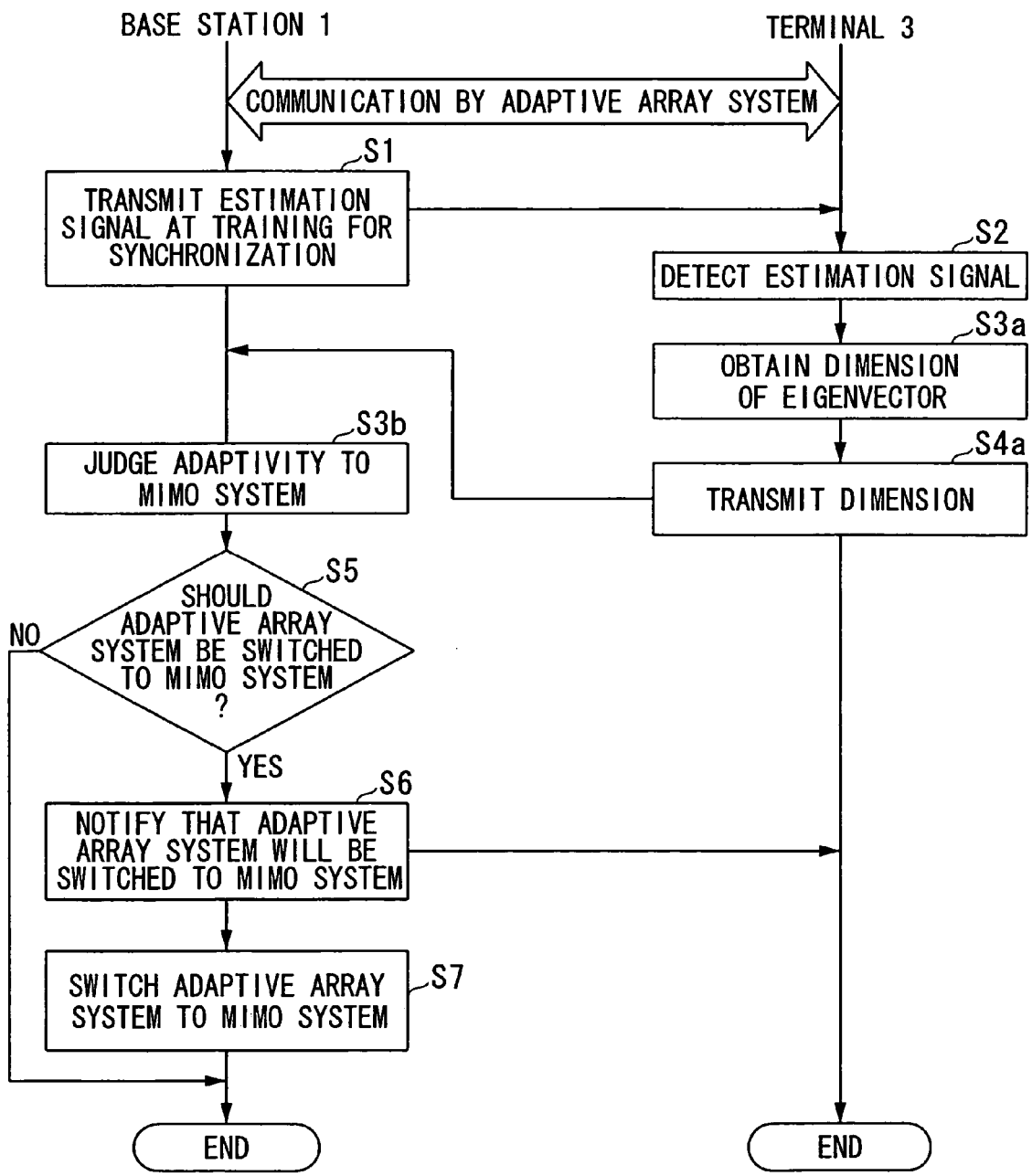
FIG. 3 is a flowchart illustrating sequential processes for switching a first type of wireless communication using an adaptive array system to a second type of wireless communication using a multi-input multi-output (MIMO) system in accordance with a second preferred embodiment of the present invention.

A second embodiment of the present invention will be described. The following descriptions will be directed to differences of the second embodiment from the above-described first embodiment. The wireless communication system of FIG. 1 is used in this embodiment. FIG. 3 is a flowchart illustrating sequential processes for switching the first type of wireless communication using the adaptive array system to the second type of wireless communication using the multi-input multi-output (MIMO) system in accordance with the second preferred embodiment of the present invention. In this embodiment, the base station 1 and the terminal 3 perform two separate processes, respectively, so as to estimate the adaptability of the wireless propagation channel to the multi-input multi-output (MIMO) system.

In the first type of wireless communication using the adaptive array system, the base station 1 performs training for synchronization with the terminal 3. In Step S1, at the time of training for synchronization, the base station 1 transmits, to the terminal 3, an estimation signal that requests an estimate of the adaptability of a wireless propagation channel to the multi-input multi-output (MIMO) system. In Step S2, the terminal 3 detects the estimation signal that has been transmitted from the base station 1. In Step S3a, in accordance with the estimation signal, the terminal 3 performs a predetermined operation to estimate the adaptability of the wireless propagation channel to the multi-input multi-output (MIMO) system. In Step S4a, the terminal 3 transmits a result of the operation to the base station 1.

The base station 1 receives the result of the operation from the terminal 3. In Step S3b, the base station 1 judges, based on the result of the operation, whether the first type of wireless communication using the adaptive array system should be continued or switched to the second type of wireless communication using the multi-input multi-output (MIMO) system. A set of the processes of Steps S3a, S4 and S3b in FIG. 3 corresponds to the above-described single process of Step S3 in FIG. 2.

In Step S6, if the first type of wireless communication using the adaptive array system should be switched to the second type of wireless communication using the multi-input multi-output (MIMO) system, then the base station 1 sends the terminal 3 a notice to switch the first type of wireless communication using the adaptive array system to the second type of wireless communication using the multi-input multi-output (MIMO) system. In Step S7, the base station 1 switches the first type of wireless communication using the adaptive array system to the second type of wireless communication using the multi-input multi-output (MIMO) system whereby the second type of wireless communication using the multi-input multi-output (MIMO) system is performed between the base station 1 and the terminal 3.

The base station 1 judges if the first type of wireless communication using the adaptive array system should be continued or switched to the second type of wireless communication using the multi-input multi-output (MIMO) system. The base station 1 makes the judgment in accordance with an available resource thereof, so as to avoid any excess load to be applied to the base station 1, thereby allowing the base station 1 to communicate with one or more different terminals than the terminal 3.

Third Embodiment

Figure 4:
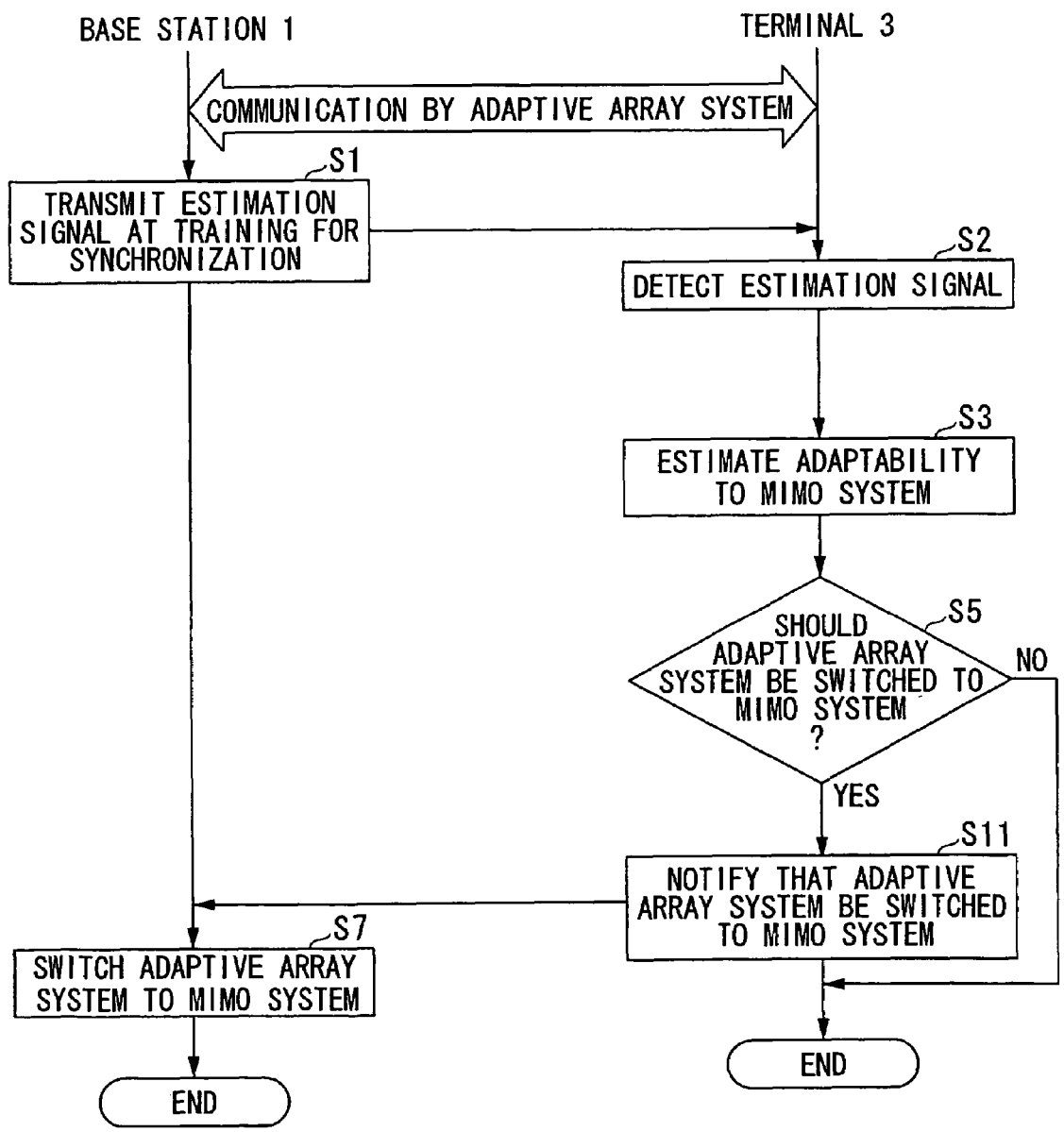
FIG. 4 is a flowchart illustrating sequential processes for switching a first type of wireless communication using an adaptive array system to a second type of wireless communication using a multi-input multi-output (MIMO) system in accordance with a third preferred embodiment of the present invention.

A third embodiment of the present invention will be described. The following descriptions will be directed to differences of the third embodiment from the above-described first embodiment. The wireless communication system of FIG. 1 is used in this embodiment. FIG. 4 is a flowchart illustrating sequential processes for switching the first type of wireless communication using the adaptive array system to the second type of wireless communication using the multi-input multi-output (MIMO) system in accordance with the third preferred embodiment of the present invention. In this embodiment, the terminal 3 not only estimates the adaptability of the wireless propagation channel to the multi-input multi-output (MIMO) system but also judges whether the first type of wireless communication using the adaptive array system should be continued or switched to the second type of wireless communication using the multi-input multi-output (MIMO) system.

In the first type of wireless communication using the adaptive array system, the base station 1 performs training for synchronization with the terminal 3. In Step S1, at the time of training for synchronization, the base station 1 transmits, to the terminal 3, an estimation signal that requests an estimate of the adaptability of a wireless propagation channel to the multi-input multi-output (MIMO) system. In Step S2, the terminal 3 detects the estimation signal that has been transmitted from the base station 1. In Step S3, in accordance with the estimation signal, the terminal 3 estimates the adaptability of the wireless propagation channel to the multi-input multi-output (MIMO) system. In Step S5, the terminal 3 judges, based on the result of the estimation, whether the first type of wireless communication using the adaptive array system should be continued or switched to the second type of wireless communication using the multi-input multi-output (MIMO) system. In Step S11, if the first type of wireless communication using the adaptive array system should be switched to the second type of wireless communication using the multi-input multi-output (MIMO) system, then the terminal 3 sends the base station 1 a request for switching the first type of wireless communication using the adaptive array system to the second type of wireless communication using the multi-input multi-output (MIMO) system. In Step S7, the base station 1 receives the request for switching from the terminal 3 and switches the first type of wireless communication using the adaptive array system to the second type of wireless communication using the multi-input multi-output (MIMO) system in accordance with the request for switching, whereby the second type of wireless communication using the multi-input multi-output (MIMO) system is performed between the base station 1 and the terminal 3.

The terminal 3 detects the estimation signal and estimates the adaptability of the wireless propagation channel and further judges if the first type of wireless communication should be continued or switched to the second type of wireless communication. The base station 1 switches the first type of wireless communication to the second type of wireless communication in accordance with the request by the terminal 3. This configuration allows the effective operation of switching the above-described communication systems while keeping a high communication speed of the wireless communication system of FIG. 1.

In the above-described first to third embodiments, the terminal 3 operates alone or in cooperation with the base station 1 so as to estimate the adaptability of the wireless propagation channel to the multi-input multi-output (MIMO) system. The process for estimating the adaptability of the wireless propagation channel to the multi-input multi-output (MIMO) system will be described in detail.

The base station 1 may serve as a transmitter. The terminal 3 may serve as a receiver. The following descriptions will be made assuming that the base station 1 is the transmitter having the first array antenna 2 that includes M of antenna elements, and the terminal 3 is the receiver having the second array antenna 4 that includes N of antenna elements. A channel response matrix (transmission function) "A" of the multi-input multi-output (MIMO) channel is given by the following equation (1).

$$A = [a_{NM}] = \begin{bmatrix} a_{11} a_{12} & \cdots & a_{1M} \\ a_{21} a_{22} & \cdots & a_{2M} \\ \vdots & \ddots & \vdots \\ a_{N1} a_{N2} & \cdots & a_{NM} \end{bmatrix} \quad (1)$$

Equation (1) can be transformed into the following equation (2). This transformation is addressed by "NAKAJIMA Nobuo (edition), in "Wireless Technique and its Application vol. 4 New Generation Wireless Technique" ISBN 4-621-07364-8, Maruzen Co. In equation (2), the channel response matrix "A" is represented by $M_0$ of eigenvalues $\lambda_1, \lambda_2, \text{---} \lambda_{M0-1}, \lambda_{MO}$, which are common to correlation matrixes $A^H A$, $AA^H$, where H is the complex conjugate transposition.

$$A = E_r D E_t^H = \sum_{i=1}^{M_0} \sqrt{\lambda_i}\, e_{ti} e_{ri}^H \quad (2)$$

$$D = \begin{bmatrix} \sqrt{\lambda_1} & 0 & \cdots & 0 \\ 0 & \sqrt{\lambda_2} & \cdots & 0 \\ \vdots & & \ddots & \vdots \\ 0 & 0 & \cdots & \sqrt{\lambda_{M_0}} \end{bmatrix}$$

In equation (2), $e_{ti}$ is the eigenvector $E_t$ that belongs to the eigenvalue $\lambda_i$ of the correlation matrix $A^H A$, and $e_{ri}$ is the eigenvector $E_r$ that belongs to the eigenvalue $\lambda_i$ of the correlation matrix $AA^H$.

$E_t = [e_{t1} e_{t2} \ldots e_{tMO}]$ $E_r = [e_{r1} e_{r2} \ldots e_{rMO}]$

Figure 5:
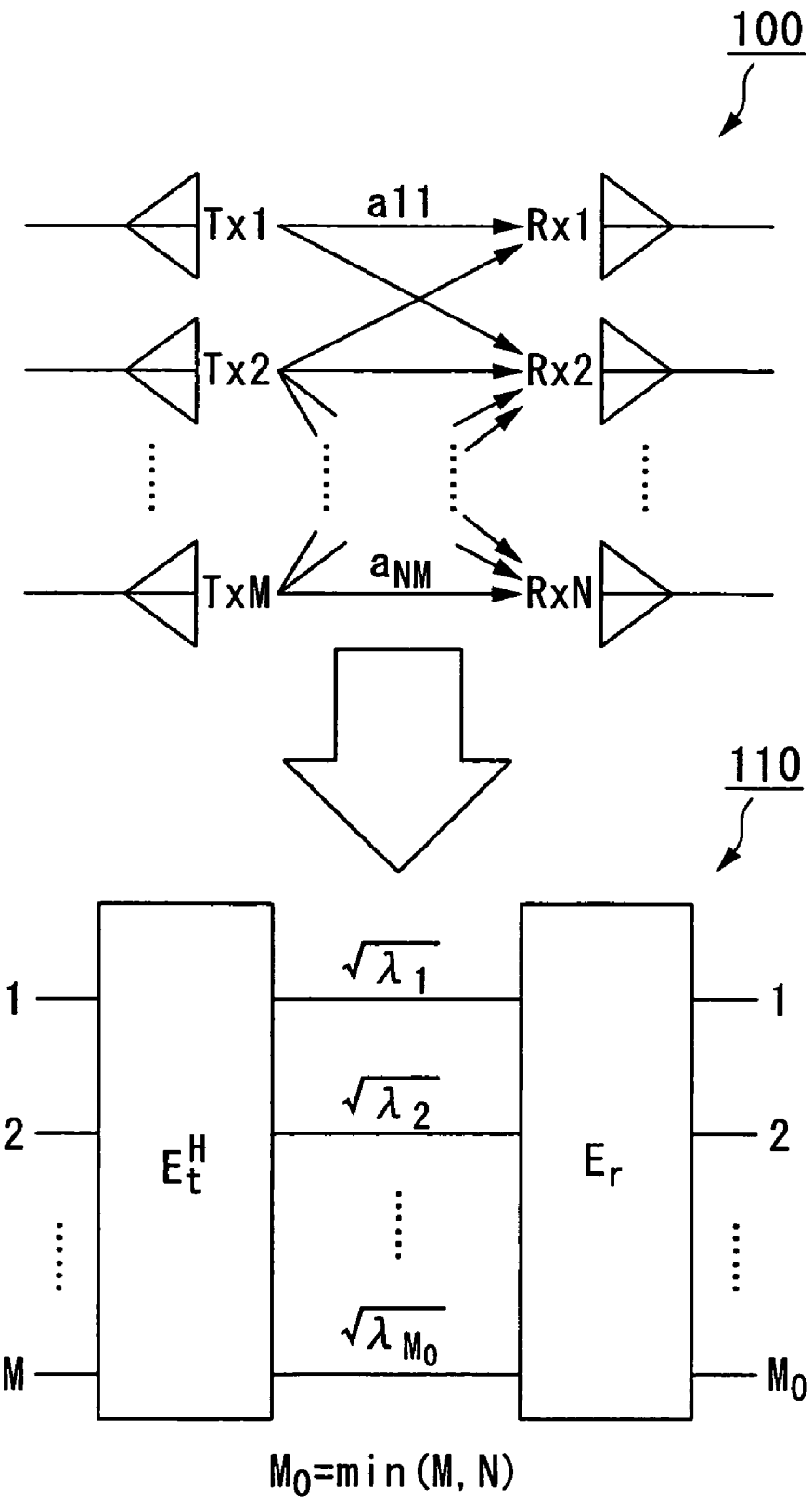
FIG. 5 is a view illustrating an original communication system and a transformed communication system that is equivalently transformed from the original communication system in accordance with preferred embodiments of the present invention.

FIG. 5 is a view illustrating an original communication system 100 and a transformed communication system 110 that is equivalently transformed from the original communication system 100, wherein the transformed communication system 110 is represented similarly to the above-described transmission function "A" that is represented by the eigenvalues $\lambda_1, \lambda_2, \text{---} \lambda_{M0-1}, \lambda_{MO}$.

In the original communication system 100, a transmitter station has a first array antenna that includes M of antenna elements Tx1 to TxM, and a receiver station has a second array antenna that includes N of antenna elements Rx1 to RxN. In the transformed communication system 110, the number $M_0$ of the eigenvalues $\lambda_1, \lambda_2, \text{---} \lambda_{M0-1}, \lambda_{MO}$ represents the dimension thereof. A large number of the substantial order of the actual radio propagation channels means a large channel capacity of the multi-input multi-output (MIMO) system. A small number of the substantial order of the actual radio propagation channels means a correlation between plural paths or channels. The magnitude of that order or the magnitude of the absolute value of a large eigenvalue is related to the adaptivity of the wireless communication channels to the second type of wireless communication using the multi-input multi-output (MIMO) system. Namely, the magnitude of the order or the magnitude of the absolute value of the large eigenvalue may be monitored in order to judge if the current status of the wireless communication is adaptable to the second type of wireless communication using the multi-input multi-output (MIMO) system. This means that, in the first type of wireless communication using the adaptive array system, the dimension of the eigenvector is compared to a predetermined threshold value. If the dimension of the eigenvector is lower than the predetermined threshold value, then the first type of wireless communication using the adaptive array system is continued. If the dimension of the eigenvector is higher than the predetermined threshold value, then the first type of wireless communication using the adaptive array system is switched to the second type of wireless communication using the multi-input multi-output (MIMO) system. A threshold value is predetermined for a spatial orthogonality of the multi-input multi-output (MIMO) channels between a respective one of the transmitter antenna elements and another respective one of receiver antenna elements.

In Step S3a of FIG. 3, an operation is made in order to obtain the dimension of the eigenvector. In Step S3b of FIG. 3, the obtained dimension is compared to the predetermined threshold value so as to judge if the current status of the wireless communication is adaptable to the second type of wireless communication using the multi-input multi-output (MIMO) system.

A judgment is made on whether the wireless propagation paths or channels have a spatial orthogonality that is higher or lower than the predetermined threshold level, so as to estimate, based on the judgment, whether the wireless propagation channel or path is adaptable or suitable to the multi-input multi-output (MIMO) system.

Figure 6:
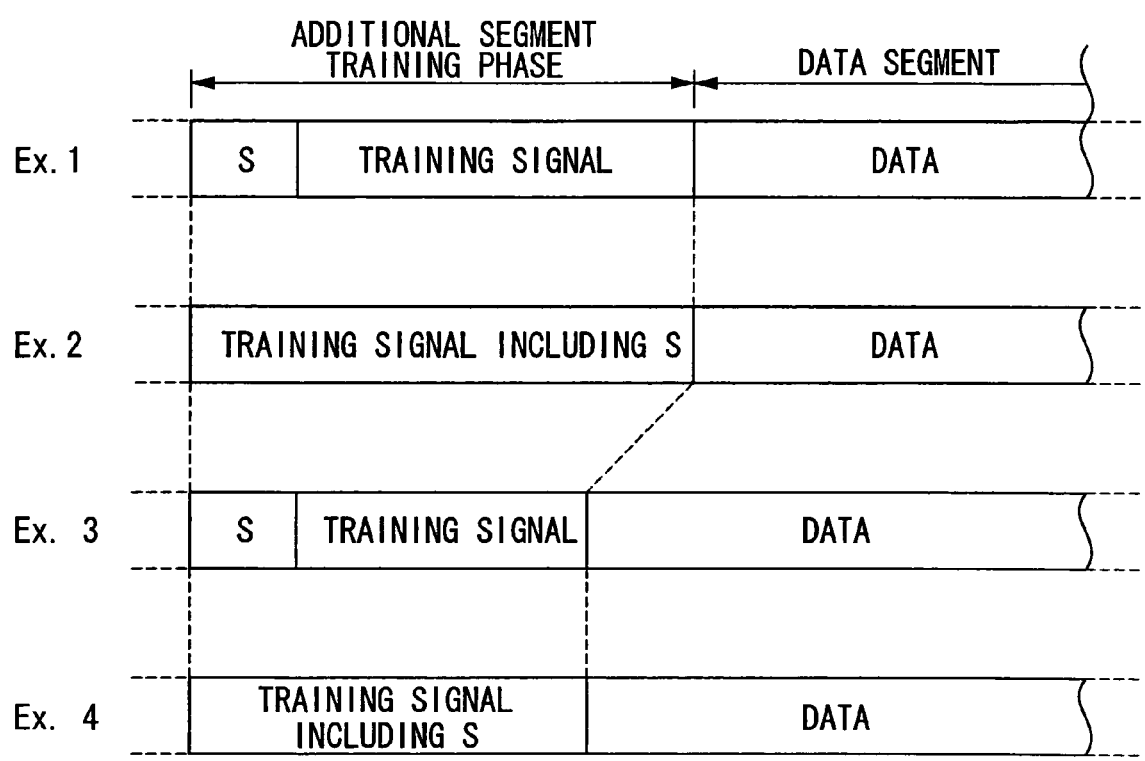
FIG. 6 is a diagram illustrating examples of a frame configuration of an estimation signal that is transmitted from a base station to a terminal at the time of training for synchronization in accordance with preferred embodiments of the present invention.

The estimation signal will be described in detail. FIG. 6 is a diagram illustrating examples of a frame configuration of the estimation signal that is transmitted from the base station 1 to the terminal 3 at the time of training for synchronization in Step S1 of FIGS. 2-4. FIG. 6 illustrates four examples of the frame configurations of the estimation signal. The frame configuration of the estimation signal comprises a data segment and an additional segment (training phase) that includes a training signal segment and an estimation signal segment S. In a first example Ex. 1, a part of the data segment is deleted, and in place the estimation signal segment S is included in the additional segment (training phase), wherein the estimation signal segment S is separated from the training signal segment. In a second example Ex. 2, a part of the data segment is deleted, and in place the estimation signal segment S is included in the additional segment (training phase), wherein the estimation signal segment S is included in the training signal. In a third example Ex. 3, a part of the training signal segment is deleted, and in place the estimation signal segment S is included in the additional segment (training phase), wherein the estimation signal segment S is separated from the training signal segment. In a fourth example Ex. 4, a part of the training signal segment is deleted, and in place the estimation signal segment S is included in the additional segment (training phase), wherein the estimation signal segment S is included in the training signal segment. In all of the first to fourth examples Ex. 1-Ex. 4, the estimation signal segment S is separated from the data segment. This means that the estimation signal is set so as to be separated from the segment that is subjected to a weighted synthesis in the adaptive array system.

The estimation on the adaptivity of the wireless propagation channel or path to the multi-input multi-output (MIMO) system is made in accordance with a transmission method which is used for transmitting the estimation signal. Typical examples of the transmission method for transmitting the estimation signal will be described.

Figure 7:
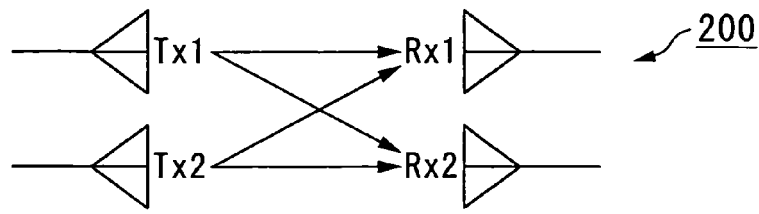
FIG. 7 is a view illustrating a time division multiplex that is used to transmit an estimation signal from a transmitter station to a receiver station in accordance with preferred embodiments of the present invention.
Figure 8:
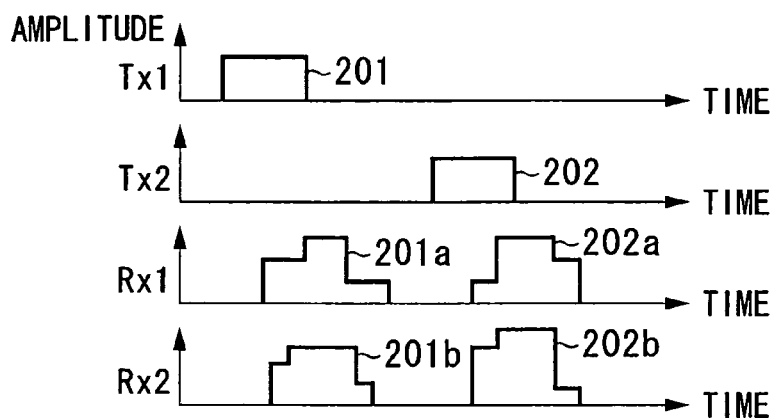
FIG. 8 is a timing chart illustrating amplitude-time waveforms of the estimation signal of FIG. 7.

FIG. 7 is a view illustrating a time division multiplex that is used to transmit the estimation signal from the transmitter station to the receiver station. FIG. 8 is a timing chart illustrating amplitude-time waveforms of the estimation signal of FIG. 7. A wireless communication system 200 includes a transmitter station and a receiver station. The transmitter station has an array antenna including two antenna elements Tx1 and Tx2. The receiver station has another array antenna including two other antenna elements Rx1 and Rx2.

As shown in FIG. 8, an estimation signal 201 is transmitted by the antenna element Tx1 of the transmitter station. After the estimation signal 201 has been transmitted by the antenna element Tx1 of the transmitter station and a predetermined period of time has elapsed, then another estimation signal 202 is transmitted by the antenna element Tx2 of the transmitter station. The estimation signals 201 and 202 may be a predetermined reference signal that can be identified by the transmitter and receiver stations. Alternatively, the estimation signals 201 and 202 may be a multi-input multi-output (MIMO) channel training signal. The estimation signal 201 is propagated over different propagation channels toward the antenna elements Rx1 and Rx2 of the receiver station so that the antenna elements Rx1 and Rx2 receive estimation signals 201a and 201b, respectively. The estimation signal 202 is also propagated over the different propagation channels toward the antenna elements Rx1 and Rx2 so that the antenna elements Rx1 and Rx2 receive different estimation signals 202a and 202b, respectively. The antennal element Rx1 receives the estimation signals 201a and 202a at different timings. The antenna element Rx2 also receives the estimation signals 201b and 202b at different timings. The estimation signals 201a, 201b, 202a and 202b are different in amplitude-time waveform and received-timings from each other. These differences are caused by differences between respective two of the four propagation channels. The spatial orthogonality of the multi-input multi-output (MIMO) channels between a respective one of the antenna elements Tx1 and Tx2 of the transmitter station and a further respective one of the antenna elements Rx1 and Rx2 of the receiver station can be estimated or detected by observing the differences in amplitude-time waveform and received-timing of the estimation signals 201a, 201b, 202a and 202b.

Figure 9:
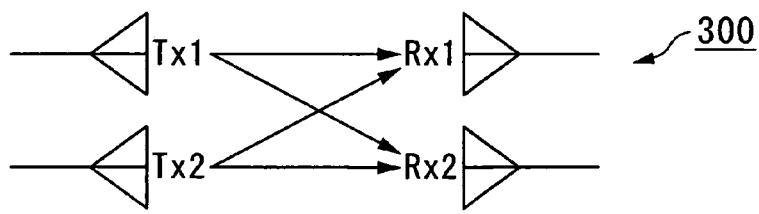
FIG. 9 is a view illustrating a frequency division multiplex that is used to transmit an estimation signal from a transmitter station to a receiver station in accordance with preferred embodiments of the present invention.
Figure 10:
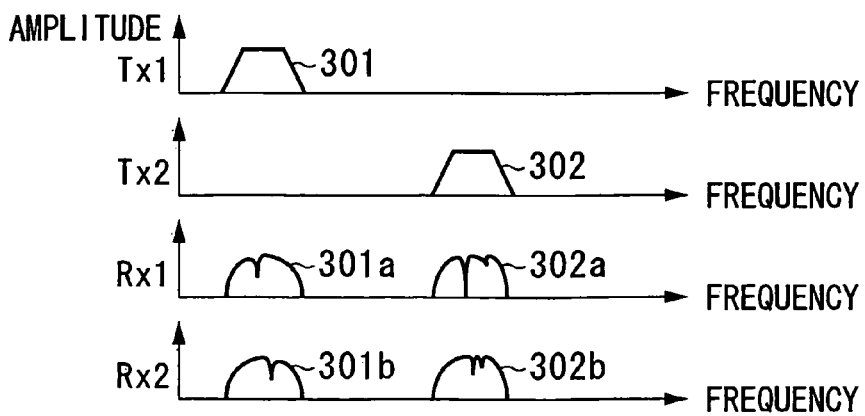
FIG. 10 is a timing chart illustrating amplitude-frequency waveforms of the estimation signal of FIG. 9.

FIG. 9 is a view illustrating a frequency division multiplex that is used to transmit the estimation signal from the transmitter station to the receiver station. FIG. 10 is a timing chart illustrating amplitude-frequency waveforms of the estimation signal of FIG. 9. A wireless communication system 300 includes a transmitter station and a receiver station. The transmitter station has the array antenna including the two antenna elements Tx1 and Tx2. The receiver station has the other array antenna including the other two antenna elements Rx1 and Rx2.

As shown in FIG. 10, an estimation signal 301 with a first frequency is transmitted by the antenna element Tx1 of the transmitter station. Another estimation signal 302 with a second frequency that is different from the first frequency is transmitted by the antenna element Tx2 of the transmitter station. The estimation signals 301 and 302 may be a predetermined reference signal that can be identified by the transmitter and receiver stations. Alternatively, the estimation signals 301 and 302 may be a multi-input multi-output (MIMO) channel training signal. The estimation signal 301 is propagated over different propagation channels toward the antenna elements Rx1 and Rx2 of the receiver station so that the antenna elements Rx1 and Rx2 receive estimation signals 301a and 301b, respectively. The estimation signal 302 is also propagated over the different propagation channels toward the antenna elements Rx1 and Rx2 so that the antenna elements Rx1 and Rx2 receive different estimation signals 302a and 302b, respectively.

Further, the estimation signals 301 and 302 with exchanged frequencies are transmitted by the antenna elements Tx1 and Tx2, respectively. Namely, the estimation signal 301 with the second frequency is transmitted by the antenna element Tx1. The estimation signal 302 with the first frequency that is different from the first frequency is transmitted by the antenna element Tx2.

The estimation signals 301a, 301b, 302a and 302b are different in amplitude-frequency waveform and frequencies from each other. These differences are caused by differences between respective two of the four propagation channels. The spatial orthogonality of the multi-input multi-output (MIMO) channels between a respective one of the antenna elements Tx1 and Tx2 of the transmitter station and a further respective one of the antenna elements Rx1 and Rx2 of the receiver station can be estimated or detected by observing the differences in amplitude-frequency waveform and frequency of the estimation signals 301a, 301b, 302a and 302b.

Figure 11:
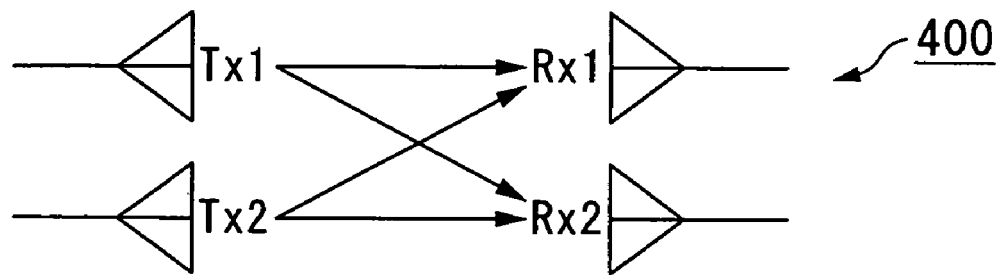
FIG. 11 is a view illustrating a spread code division multiplex that is used to transmit an estimation signal from a transmitter station to a receiver station.
Figure 12:
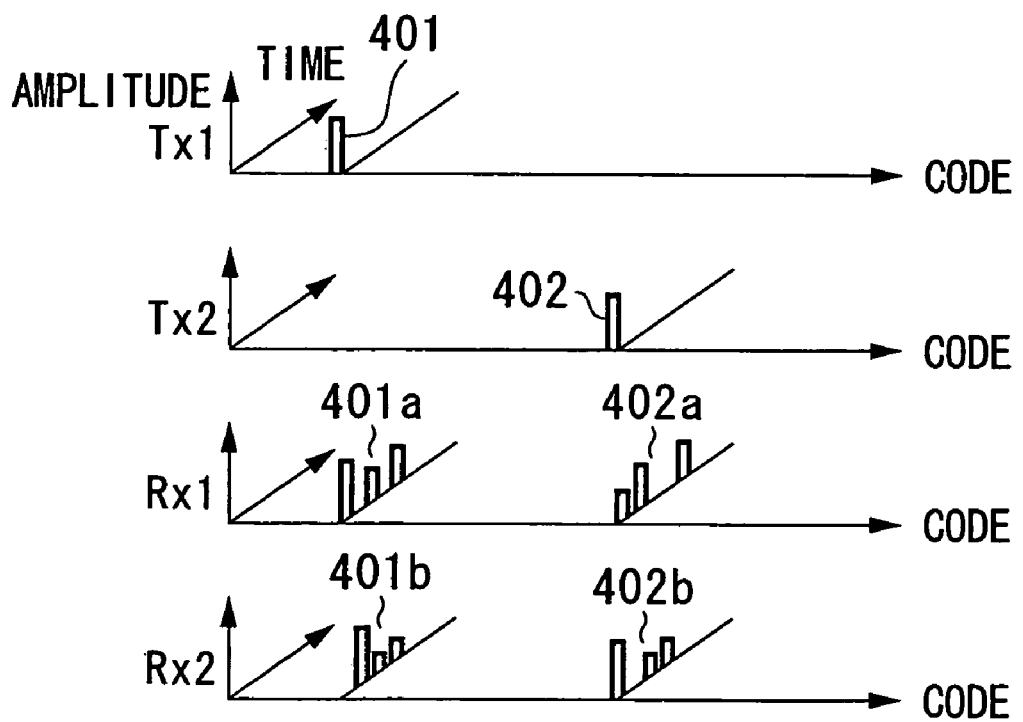
FIG. 12 is a timing chart illustrating amplitude-time-code waveforms of the estimation signal of FIG. 11.

FIG. 11 is a view illustrating a spread code division multiplex that is used to transmit the estimation signal from the transmitter station to the receiver station. FIG. 12 is a timing chart illustrating amplitude-time-code waveforms of the estimation signal of FIG. 11. A wireless communication system 400 includes a transmitter station and a receiver station. The transmitter station has the array antenna including the two antenna elements Tx1, Tx2. The receiver station has the other array antenna including the other two antenna elements Rx1, Rx2.

As shown in FIG. 12, an estimation signal 401 with a first spread code is transmitted by the antenna element Tx1 of the transmitter station. Another estimation signal 402 with a second spread code that is different from the first spread code is transmitted by the antenna element Tx2 of the transmitter station. The estimation signals 401 and 402 may be a predetermined reference signal that can be identified by the transmitter and receiver stations. Alternatively, the estimation signals 401 and 402 may be a multi-input multi-output (MIMO) channel training signal. The estimation signal 401 is propagated over different propagation channels toward the antenna elements Rx1 and Rx2 of the receiver station so that the antenna elements Rx1 and Rx2 receive estimation signals 401a and 401b, respectively. The estimation signals 401a and 401b are different in inverse code from each other. The estimation signal 402 is also propagated over the different propagation channels toward the antenna elements Rx1 and Rx2 so that the antenna elements Rx1 and Rx2 receive different estimation signals 402a and 402b, respectively. The estimation signals 402a and 402b are different in inverse code from each other.

The estimation signals 401a, 401b, 402a and 402b are different in amplitude-time-code waveform and inverse-code from each other. These differences are caused by differences between respective two of the four propagation channels. The spatial orthogonality of the multi-input multi-output (MIMO) channels between a respective one of the antenna elements Tx1 and Tx2 of the transmitter station and a further respective one of the antenna elements Rx1 and Rx2 of the receiver station can be estimated or detected by observing the differences in amplitude-time-code waveform and inverse-code of the estimation signals 401a, 401b, 402a and 402b.

In each of the above-described time-division multiplex, frequency-division multiplex, and spread code division multiplex, a period of time for inserting the estimation signal should not be limited. For example, the estimation signal may be inserted into the frame for the adaptive array system. Alternatively, the estimation signal may also be distributed into a plurality of frames. For example, each estimation signal to be transmitted by each antenna element is distributed into a plurality of frames. If the number of the antenna elements is small, the estimation signal may be inserted to each frame for the adaptive array system. If the number of the antenna elements is large, the estimation signal may be distributed into the plurality of frames.

In accordance with the above-described first to third embodiments, the spatial orthogonality of the multi-input multi-output (MIMO) channels between a respective one of the antenna elements Tx1 and Tx2 of the transmitter station and a further respective one of the antenna elements Rx1 and Rx2 of the receiver station is estimated or detected so as to determine and use a more adaptable and suitable one of the adaptive array system and the multi-input multi-output (MIMO) system. At the time of training for synchronization in the first type of wireless communication using the adaptive array antenna, the estimation signal is transmitted for estimating the spatial orthogonality between the multi-input multi-output (MIMO) channels. This allows switching the first type of wireless communication using the adaptive array system to the second type of wireless communication using the multi-input multi-output (MIMO) system without discontinuing the current communication or communications between the transmitter and receiver stations.

There is no need to provide any additional controller for switching the first type of wireless communication using the adaptive array system to the second type of wireless communication using the multi-input multi-output (MIMO) system, thereby avoiding any increase of the cost.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication method comprising:
   transmitting an estimation signal from a first communication device with a first plurality of antenna elements to a second communication device with a second plurality of antenna elements at a training phase for synchronization in a first type of wireless communication using an adaptive array system between the first and second communication devices;
   detecting the estimation signal by the second communication device; and
   estimating, based on the detection of the estimation signal, whether or not a wireless communication channel between the first and second communication devices is adaptable to a second type of wireless communication using a multi-input multi-output (MIMO) system.

2. The wireless communication method according to claim 1, wherein estimating comprises judging whether or not a spatial orthogonality of the wireless communication channels is higher than a predetermined threshold level.

3. The wireless communication method according to claim 1, wherein the estimation signal is separated from a segment that is subjected to a weighted synthesis in the adaptive array system.

4. A wireless communication system comprising:
   a first communication device having a first plurality of antenna elements; and
   a second communication device having a second plurality of antenna elements,
   the first and second communication devices being adapted to perform a first type of wireless communication with each other using an adaptive array system and a second type of wireless communication with each other using a multi-input multi-output (MIMO) system, the first communication device further comprising:

a first transmitter that transmits an estimation signal to the second communication device at a training phase for synchronization in the first type of wireless communication, and the second communication device further comprising:

a detector that detects the estimation signal; and an estimating unit that estimates, based on the detection of the estimation signal, whether or not a wireless communication channel between the first and second communication devices is adaptable to the second type of wireless communication.

5. The wireless communication system according to claim 4, wherein the second communication device further comprises:

a second transmitter that transmits a result of estimation made by the estimating unit to the first communication device, and the first communication device further comprises:

a judging unit that judges, based on the result of estimation, whether the first type of wireless communication should be continued or switched to the second type of wireless communication;

a third transmitter that transmits, to the second communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

6. The wireless communication system according to claim 4, wherein the second communication device further comprises:

a judging unit that judges, based on a result of estimation made by the estimating unit, whether the first type of wireless communication should be continued or switched to the second type of wireless communication; and a switch-requesting unit that transmits, to the first communication device, a request for switching the first type of wireless communication to the second type of wireless communication, and the first communication device further comprises:

a switching unit that switches, in accordance with the request by the switch-requesting unit, the first type of wireless communication to the second type of wireless communication.

7. A wireless communication system comprising:

a first communication device having a first plurality of antenna elements; and a second communication device having a second plurality of antenna elements, the first and second communication devices being adapted to perform a first type of wireless communication with each other using an adaptive array system and a second type of wireless communication with each other using a multi-input multi-output (MIMO) system, the first communication device further comprising:

a first transmitter that transmits an estimation signal to the second communication device at a training phase for synchronization in the first type of wireless communication, and the second communication device further comprising:

a detector that detects the estimation signal;

an operating unit that performs a predetermined operation to estimate, based on the detection of the estimation signal, whether or not a wireless communication channel between the first and second communication devices is adaptable to the second type of wireless communication; and a second transmitter that transmits a result of the operation made by the operating unit to the first communication device, and the first communication device further comprises:

a first judging unit that judges, based on the result of operation, whether or not a wireless communication channel between the first and second communication devices is adaptable to the second type of wireless communication;

a second judging unit that judges, based on the result of judgment by the first judging unit, whether the first type of wireless communication should be continued or switched to the second type of wireless communication;

a third transmitter that transmits, to the second communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

8. A wireless communication device adapted to perform a first type of wireless communication with a different wireless communication device by using an adaptive array system and a second type of wireless communication with the different wireless communication device by using a multi-input multi-output (MIMO) system, the wireless communication device comprising:

a plurality of antenna elements;

a first transmitter that transmits an estimation signal to the second communication device at a training phase for synchronization in the first type of wireless communication;

a judging unit that judges whether the first type of wireless communication should be continued or switched to the second type of wireless communication, based on a result of estimation of whether or not a wireless communication channel to the different wireless communication device is adaptable to the second type of wireless communication;

a second transmitter that transmits, to the different wireless communication device, a notice of switching the first type of wireless communication to the second type of wireless communication if the judging unit has judged that the first type of wireless communication should be switched to the second type of wireless communication; and a switching unit that switches the first type of wireless communication to the second type of wireless communication if the judging unit has judged that the first type of wireless communication should be switched to the second type of wireless communication.

9. A wireless communication device adapted to perform a first type of wireless communication with a different wireless communication device by using an adaptive array system and a second type of wireless communication with the different wireless communication device by using a multi-input multi-output (MIMO) system, the wireless communication device comprising:
- a plurality of antenna elements;
- a first transmitter that transmits an estimation signal to the second communication device at a training phase for synchronization in the first type of wireless communication; and
- a switching unit that switches the first type of wireless communication to the second type of wireless communication in accordance with a request for switching the first type of wireless communication to the second type of wireless communication.

10. A wireless communication device adapted to perform a first type of wireless communication with a different wireless communication device by using an adaptive array system and a second type of wireless communication with the different wireless communication device by using a multi-input multi-output (MIMO) system, the wireless communication device comprising:
- a plurality of antenna elements;
- a detector that detects an estimation signal that is transmitted from the different wireless communication device; and
- an estimating unit that estimates, based on the detection of the estimation signal, whether or not a wireless communication channel to the different wireless communication device is adaptable to the second type of wireless communication.

11. The wireless communication device according to claim 10, further comprising:
- a second transmitter that transmits a result of estimation made by the estimating unit to the different wireless communication device.

12. The wireless communication device according to claim 10, further comprising:
- a judging unit that judges, based on a result of estimation made by the estimating unit, whether the first type of wireless communication should be continued or switched to the second type of wireless communication; and
- a switch-requesting unit that transmits, to the different wireless communication device, a request for switching the first type of wireless communication to-the second type of wireless communication.

13. A wireless communication device adapted to perform a first type of wireless communication with a different wireless communication device by using an adaptive array system and a second type of wireless communication with the different wireless communication device by using a multi-input multi-output (MIMO) system, the wireless communication device comprising:
- a plurality of antenna elements;
- a detector that detects a estimation signal that is transmitted from the different wireless communication device;
- an operating unit that performs a predetermined operation to estimate, based on the detection of the estimation signal, whether or not a wireless communication channel to the different wireless communication device is adaptable to the second type of wireless communication; and
- a transmitter that transmits a result of the operation made by the operating unit to the different wireless communication device.

* * * * *